June 2, 1953  J. F. SHANNON  2,640,356
VARIABLE ORIFICE FLOWMETER
Filed April 22, 1950  2 Sheets-Sheet 1

Inventor
JACK F. SHANNON
By Raymond W. Jenkins
Attorney

INVENTOR.
JACK F. SHANNON
BY Raymond W. Jenkins
ATTORNEY

Patented June 2, 1953

2,640,356

UNITED STATES PATENT OFFICE 2,640,356

VARIABLE ORIFICE FLOWMETER

Jack F. Shannon, Euclid, Ohio, assignor to Bailey Meter Company, a corporation of Delaware Application April 22, 1950, Serial No. 157,597

3 Claims. (Cl. 73—208)

My invention relates to improvements in gas flowmeters, and particularly in that type of flowmeter whose provision of a variable area orifice opening for the passage of fluid therethrough has given rise to the designation, "area meter." The structure changing the opening is adapted to transmit, or telemeter, to a remotely located receiver which may indicate and/or record the flow rate of fluid through the opening.

Although these flowmeters have been generally regarded as capable of measuring substantially any flowing fluid, the measurement of gaseous fluids has presented certain problems which my present invention eliminates. It has been observed that the compressibility of gases combined with inertia of the meter parts results in vibration or pulsation of the meter parts with consequent unsteadiness and sometimes inaccuracy of final indication.

The more obvious approach to the solution of this problem appeared to lie in reducing the differential across the meter valve and/or increase the weight of the movable parts of the meter. This action generally resulted in necessitating the use of expensively large sized meter bodies for specific jobs. Even then the problem was but approximately solved and the whole technique regarded as an unsatisfactory solution.

An object, therefore, of my invention, is to improve the operation of area meters.

Another object is to increase the capacity of area meters over the range of practical operation.

Another object is the reduction of record fluctuation in area meters.

Figure 1:
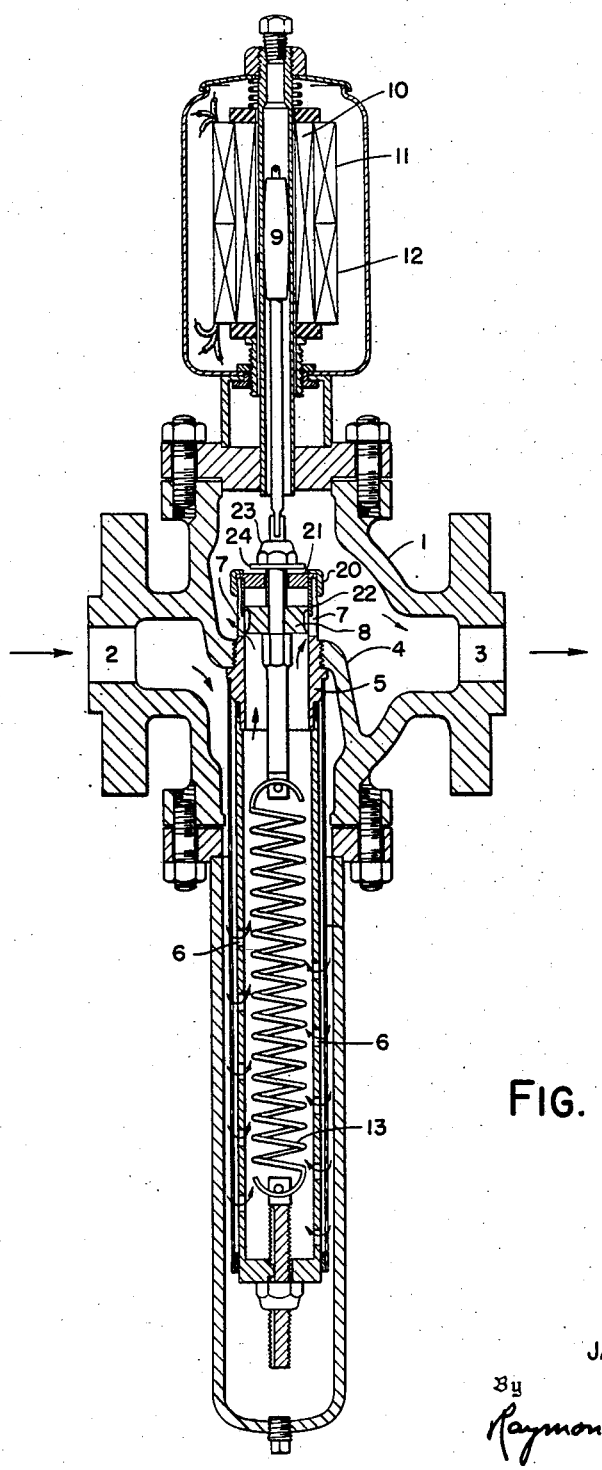
Fig. 1 is a sectional elevation through a flowmeter in which is embodied my inventive structure.

The meter as shown in Fig. 1 includes a casing 1 having intake and discharge ports 2 and 3 separated by a partition 4. A cylindrical sleeve member 5 carried by the partition may have an elongated extension as shown with ports 6 communicating with casing intake port 2 and sleeve slots 7 communicating with discharge port 3 of the casing. A plug 8 extends into sleeve 5 and is acted upon by the fluid flowing into the latter from the casing intake port 2.

A core piece 9 is carried by the plunger 8 and is positionable by the latter relative to windings 10, 11 and 12 forming the primary and secondary of a movable core transformer whose electrical signal represents the measured flow. The plug is moved upwardly against the weight of the parts and the action of a spring 13 attached thereto in proportion to the flow of fluid through the casing. It is understood, of course, that a weight may be used in the place of spring 13 to gravity-resist movement of the plug rather than the spring force provided here. A definite relationship between the position of plug 8 and orifice slot 7 results for every value of rate of flow and pressure differential between casing ports 2 and 3.

The plot of vertical plug movement relative to volume rate or weight rate of fluid flow through the slot 7 is substantially a straight line. If under certain fluid conditions the deviation from a straight line is greater than the allowable metering error, then the slots 7 may be taper shaped to correct the relationship to linearity so that the positioning of the core 9 relative to the windings 10, 11 and 12 will vary directly with rate of fluid flow.

Preferably the clearance between the maximum diameter of the plug and the mating internal diameter of the sleeve 5 is kept in the order of .001″ to .005″. By this construction substantially no leakage is obtained at no flow position. The construction as a whole is extremely stable and frictionless due to the relatively long spring utilized to balance the force the fluid flow exerts upon the plug 8.

Figure 2:
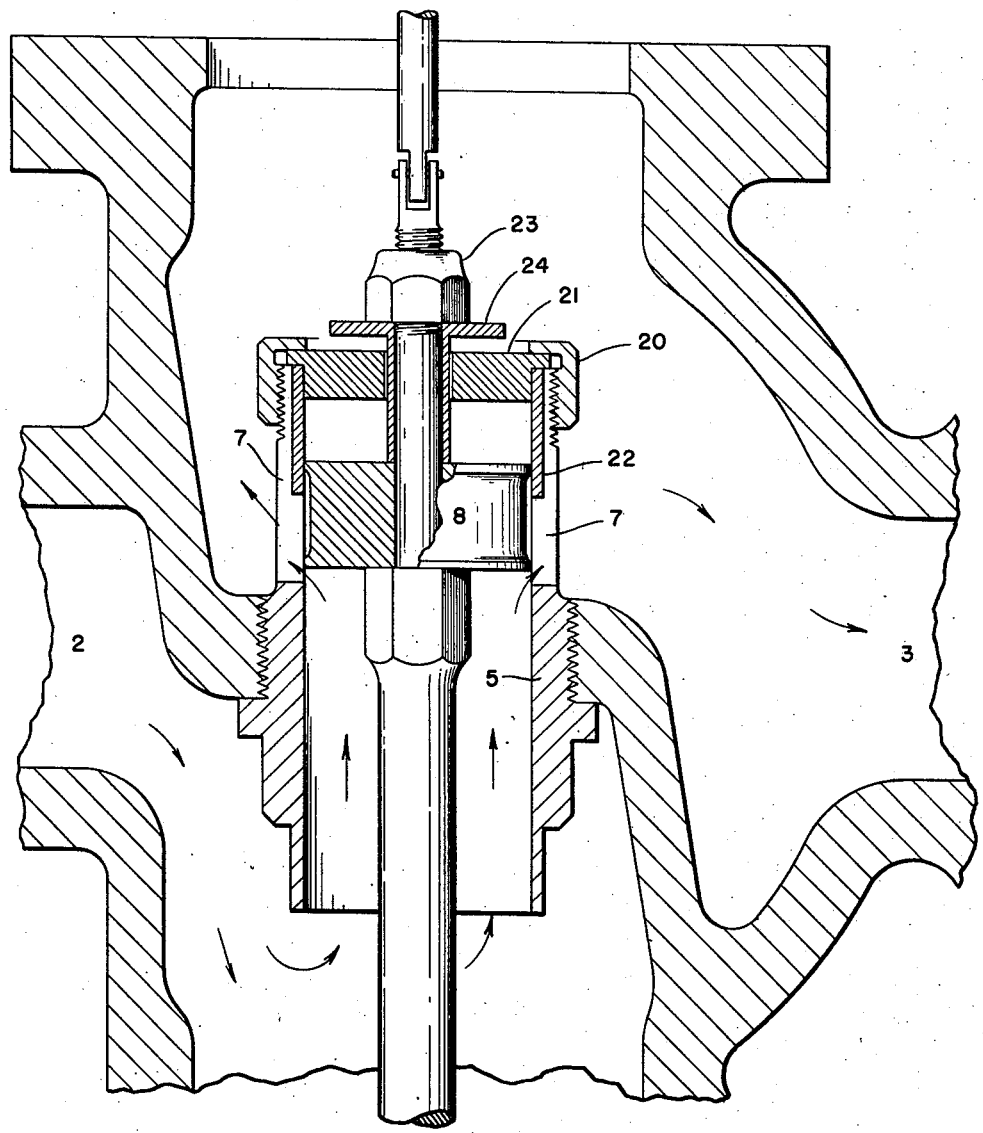
Fig. 2 is a sectional elevation to enlarged scale of a part of Fig. 1 disclosing specific details of my structure.

In Fig. 2 I illustrate the structure of my invention in greater detail than is possible with the scale of Fig. 1. A complete 180° section has been taken of the casing and sleeve and approximately one-fourth of the plug 8. The cooperation of plug 8 and slots 7 within the sleeve 5 to allow fluid passage with the added effect imparted by my invention will now be described.

Specifically, threads are provided upon the upper end of slotted sleeve member 5 by means of which a retaining ring 20 is secured thereto. A disc, or plate member, 21 is retained by this ring 20 to form a closure cap for the sleeve end.

I have formed a piston-cylinder structure in the upper, capped, portion of the slotted sleeve 5 by placing an unbroken, solid, insert member 22 in the inner portion of the slotted wall. The inner dimensions of sleeve and insert are made the same so plug 8 will reciprocate smoothly within the two over their junction. The insert is given a longitudinal dimension which will allow maximum flow through slots 7 when unobstructed by plug 8. Therefore, when plug 8 reciprocates in accordance with flow rate variation, it cooperates with insert 22 as a piston in a cylinder, trapping fluid between the two and plate-disc 21.

I have shown plug 8 fixed in position on its rod-link between spring 13 and core 9 by a shoulder of the rod on its one side and a flanged sleeve 24 pressing down on its other side. A nut 23 is screwed down on the flange of sleeve 24, capturing the plug 8 securely. The flange of member 24 I have shown serves as a stop member for the purpose of limiting the movement of plug 8 in the direction of slots 7 closure. With this structure the movement of plug 8 in the direction of slot closure is limited, normally, to just completely block fluid passage through slots 7.

The clearance between plate 21 and sleeve 24, as well as that between plug 8 and insert 22, allows fluid passage, restricted sufficiently to produce a force upon plug 8 which resists reciprocation. Clearance normally needed to allow reciprocation of plug 8 in insert 22 will sufficiently restrict the passage of fluid to and from the chamber so formed for production of the desired force upon plug 8. However, should a special application require greater fluid passage, it is well within the scope of my invention to provide a larger passage between flanged sleeve 24 and disc 21 and/or plug 8 and insert 22 by sizing with nominal experimentation.

The wide and frequent transient pressure variations in metered gases will not produce vibration or erratic records if the structure I have thus disclosed is utilized. The plug 8 will reciprocate smoothly in accordance with the pressure difference variation between openings 2 and 3 in giving a true representation of flow through the meter body and this operation will be maintained over a wide differential of pressure. Thus the capacity of these meters is greatly increased and record improvement insured by my invention.

Figure 3:
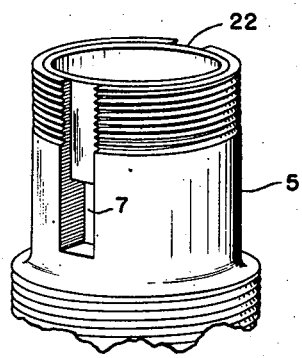
Fig. 3 is a perspective view showing a specific detail of my structure.

In Fig. 3 I have shown, by a perspective view, the relative position assumed by sleeve 5 and insert 22. It is obvious from a study of both Figs. 2 and 3 that the capacity of a particular size of this type of meter is determined by the distance insert 22 is permitted to extend down into slots 7 in determination of the size of aperture created thereby for the flow of fluid through the meter body.

Although I have disclosed and described a preferred embodiment of my invention, it is understood that I am not to be limited thereby except in accordance with the scope of the appended claims.

What I claim as new, and desire to secure by Letters Patent of the United States, is:

1. A gas flowmeter including in combination, a housing having inlet and outlet ports and a separating partition therebetween providing inlet and outlet port housing spaces, a cylindrical sleeve member mounted in the partition and extending therethrough, said cylindrical sleeve member opening and projecting at one end into the outlet port housing space, and said cylindrical sleeve member having slots formed in the portion projecting into the outlet port housing space and which terminate at the separating partition, a plug reciprocable within the cylindrical sleeve member cooperating with the slots to form a variable opening between the ports, an insert sleeve member within the slotted portion of the cylindrical member fixing the longitudinal dimension of the slots at a dimension less than that of the reciprocating plug, a stem secured to the plug and extending into the outlet port housing space, means surrounding the stem and closing the insert sleeve member above the plug thus forming a pressure chamber, reciprocal movement of the plug into the pressure chamber being opposed by the gas pressure within the pressure chamber between the plug and closing means, a means connected with the inner end of the plug yieldingly urging the plug in slot closing position, a stop member secured on the stem member and engageable with the outside of the closing means to determine the slot closing position of the plug, and means connected with said extending stem for obtaining a manifestation of plug position.

2. A gas flowmeter including in combination, a housing having inlet and outlet ports and a separating partition therebetween providing inlet and outlet port housing spaces, a cylindrical sleeve member mounted in the partition and extending therethrough, said cylindrical sleeve member opening and projecting at one end into the outlet port housing space, and said cylindrical sleeve member having slots formed in the portion projecting into the outlet port housing space and which terminate at the separating partition, a plug reciprocable within the cylindrical sleeve member cooperating with the slots to form a variable opening between the ports, an insert sleeve member within the slotted portion of the cylindrical member fixing the longitudinal dimension of the slots at a dimension less than that of the reciprocating plug, a stem secured to the plug and extending into the outlet port housing space, means surrounding the stem and closing the insert sleeve member above the plug thus forming a pressure chamber, reciprocable movement of the plug into the pressure chamber being opposed by the gas pressure within the chamber between the plug and closure means, a means connected with the inner end of the plug yieldingly urging the plug in slot closing position, and means connected with said extending stem for obtaining a manifestation of plug position.

3. A gas flowmeter including in combination, a housing having inlet and outlet ports and a separating partition therebetween providing inlet and outlet port housing spaces, a cylindrical member supported by the partition and extending therethrough, said cylindrical member opening and projecting at one end into the outlet port housing space, and the cylindrical member having slots formed in the wall portion projecting into the outlet port housing space and which terminate at the separating partition, a plug reciprocable within the cylindrical member cooperating with the slots to form a variable opening between the ports, an insert member within the slotted wall portion of the cylindrical member fixing the longitudinal dimension of the slots at a dimension less than that of the reciprocating plug, means closing the insert member outwardly of the plug thus forming a pressure chamber, reciprocable movement of the plug into the pressure chamber being opposed by the gas pressure within the chamber between the plug and closing means, means attached to the inlet side of the plug for yieldingly urging the plug toward a slot closing position, and means for obtaining a manifestation of plug position.

JACK F. SHANNON.

References Cited in the file of this patent

UNITED STATES PATENTS

| Number | Name | Date |
|---|---|---|
| 426,919 | Claret | Apr. 29, 1890 |
| 2,069,309 | Henszey | Feb. 2, 1937 |
| 2,459,689 | Dickey et al. | Jan. 18, 1949 |